Feb. 7, 1967    R. MATHEY    3,302,465
INERTIAL TACHOMETERS
Filed April 13, 1964    3 Sheets-Sheet 1

United States Patent Office 3,302,465
Patented Feb. 7, 1967

3,302,465
INERTIAL TACHOMETERS
Raymond Mathey, Paris, France, assignor to CSF—Compagnie Generale de Telegraphie Sans Fil, a corporation of France
Filed Apr. 13, 1964, Ser. No. 359,315
Claims priority, application France, Apr. 19, 1963, 932,050
6 Claims. (Cl. 73—505)

The present invention relates to inertial tachometers, more precisely of the type used for measuring the rotation velocity of a platform.

Some velocity measuring devices, used in inertial navigation, have as their main component a tuning fork mounted on a rod. This tuning fork is submitted to continuous periodic bending, and any rotation of the platform carrying the fork about the axis of the latter results in a periodic torsion of the rod. The amplitude of this torsion is proportional to the angular velocity of this rotation, the resonance period of the rod being inherently the same as the tuning fork vibration period.

The trouble with such devices is that they have no symmetry center, which results in spurious vibrations.

Furthermore the input axis, that is to say the axis about which the platform rotates, and the output axis, that is to say the axis about which the torque is applied, coincide, which results in spurious couplings between measurements circuits and those used to cause the vibration of the fork.

More precisely, it is an object of this invention to provide an inertial tachometer device for measuring angular vibrations which is free from the above trouble.

The inertial tachometer according to the invention comprises a rod, which is perpendicular to the axis about which the platform rotates and carries two identical prongs. The prongs are supported by the rod at their center so that the structure has somewhat the configuration of capital H. Means are provided for causing prongs to vibrate in a direction parallel to the rod which supports them and further means are provided for measuring at a point remote from the rod center of symmetry, the torsional torques applied to the rod.

The invention will be best understood from the following description and appended drawing wherein.

Figure 1:
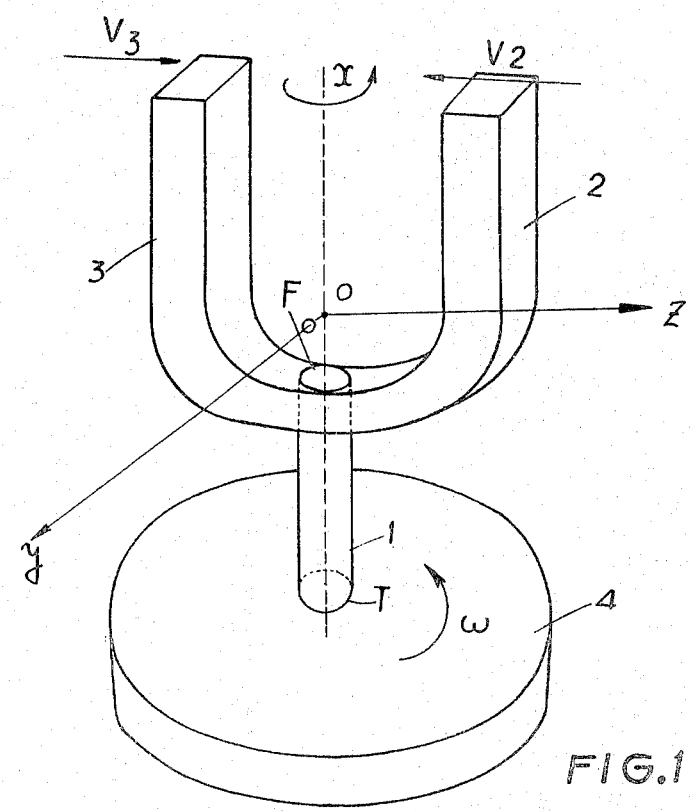
FIG. 1 shows diagrammatically a conventional tuning fork inertial tachometer.

The inertial tachometer shown in perspective in FIG. 1 comprises a tuning fork with two vibrating prongs 2 and 3 supported by a rod 1. Prongs 2 and 3 vibrate 180° out of phase and their instantaneous vibration directions are respectively represented by vectors $$\vec{V_2}$$

and $$\vec{V_3}$$

The fork is mounted on a platform 4, rigidly connected to the moving body.

It is known that if platform 4 rotates with an angular velocity $\omega$ about the axis of rod 4, an alternating torque is applied to this rod. The amplitude of this torque is proportional to the angular velocity of the platform and its period is equal to the vibration period of prongs 2 and 3. Well known means measure the amplitude of the torsional vibration and thus the platform rotation velocity.

Such devices are well known in the art and are highly useful in inertial navigation. However, they have one drawback: they have no symmetry center.

This may cause spurious vibrations. Under such conditions, the two vibration modes wanted, i.e. the flexural vibration of the prongs and the torsional vibration of the rod, are not the only ones present and this makes it difficult to decouple the vibration modes. False zeros appear and the determination of the true zero is made uncertain.

Figure 2:
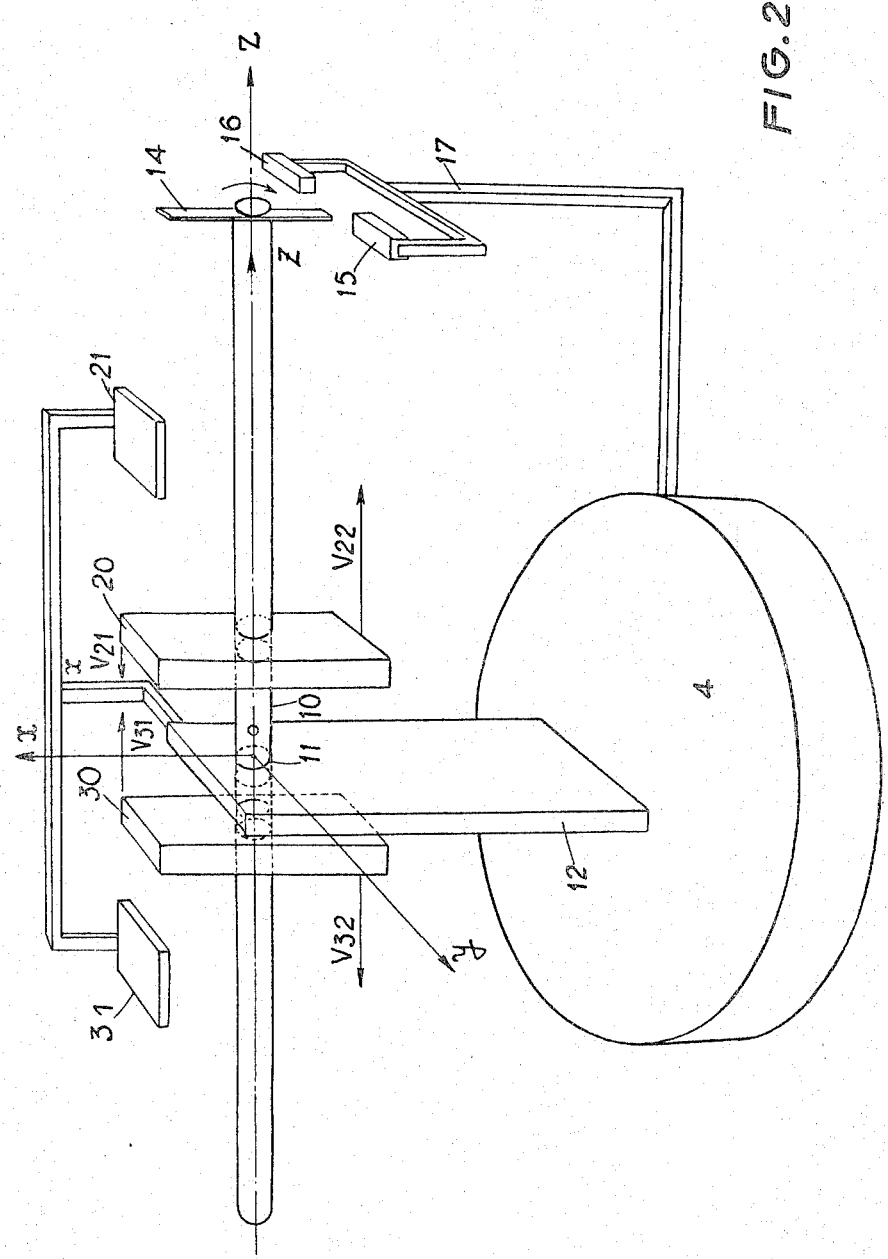
FIG. 2 shows diagrammatically in perspective view an inertial tachometer according to the invention.

The device according to the invention, illustrated in FIG. 2, is free from this trouble. It comprises a platform 4, whose "sensitive" axis is $Ox$ and a rod 10 which extends along an axis $Oz$ perpendicular to $Ox$. Rod 10 is supported, for example by means of a ring 11, by a support 12 rigidly connected to platform 4 and symmetrical with respect to axis $Ox$. Rod 10 carries two identical prongs, 20 and 30, which are symmetrical with respect to the center O of the cross section of rod 10 intermediate prongs 20 and 30, so that O is the center of symmetry of the structure.

Prongs 20 and 30 are submitted to a flexural vibration, for example by means of coils, diagrammatically shown at 21 and 31 and whose axes are parallel to $Oz$. These vibrations, as for the above mentioned tuning fork, have the same magnitude, the same period and are 180° out of phase. The instantaneous vibration directions of the four half-prongs are represented by vectors $$\vec{V}_{21} \vec{V}_{22}$$
$$\vec{V}_{31} \vec{V}_{32}$$

whose direction is that of rod 10.

The moments of inertia with respect to axis $Ox$ are made to vary in a pulsed manner due to flexural movement of the prongs, which results in torsional couples $$\vec{V}_{23}, \vec{V}_{24}$$

and $$\vec{V}_{33}, \vec{V}_{34}$$

at the frequency of coils 21 and 31.

Coils 21 and 31 are supported by support 12. Rod 10 carries at one of its ends, a small metal tongue 14, which can move between two coils 15 and 16 rigidly supported by platform 4, by means of a bracket 17. The displacement of tongue 14, and consequently the amplitude of the torsional torque applied to rod 10, can thus be measured in a well known manner.

Figure 3:
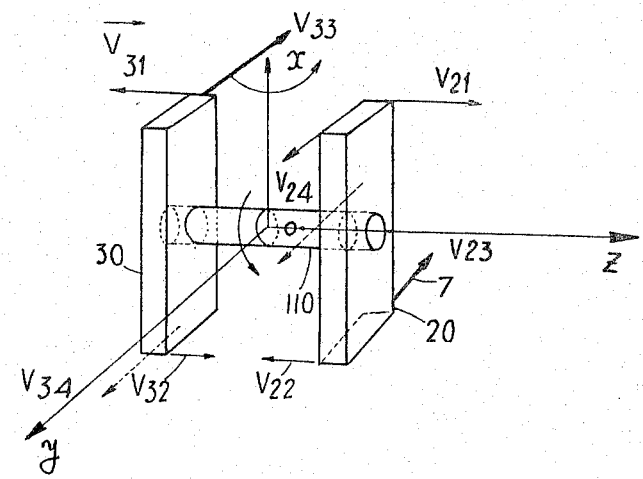
FIG. 3 illustrates the forces applied to the device of FIG. 2.

The operation of the device shown in FIG. 2 will be better understood with reference to FIG. 3, which shows prongs 20 and 30, rod 10 and the applied forces. The platform is assumed to rotate about axis $Ox$ with a constant angular velocity $\omega$. The axis $Oy$ will complete the trirectangular reference frame $Oxyz$.

Couples $$\vec{V}_{21}-\vec{V}_{22} \text{ and } \vec{V}_{31}-\vec{V}_{32}$$

whose axes are parallel to $Oz$ are applied to prongs 20 and 30 and cause them to vibrate.

As platform 4 rotates about the axis $Ox$ with a uniform angular velocity $\omega$, torsional couples are applied to prongs 20 and 30. These couples are represented by vectors $$\vec{V}_{23}-\vec{V}_{24}$$

for prongs 20 and $$\vec{V}_{33}-\vec{V}_{34}$$

for prong 30. These couples are alternating and in phase opposition and have the same frequency as the vibration applied to prongs 20 and 30, and have a magnitude proportional to ω.

The direction of vectors $$\vec{V}_{23}, \vec{V}_{24}, \vec{V}_{33} \text{ and } \vec{V}_{34}$$

is that of the Oy axis.

This results in a torsion of rod 10 at the same frequency and the amplitude of this torsion, which is proportional to ω, is measured by coils 15 and 16, thus providing a measure of ω.

It is to be noted that center of symmetry O is both a geometrical and a dynamic center of symmetry, the applied forces being symmetrical with respect to this center and plane xOy being a nodal plane for both vibration modes.

The problem of fixing the assembly to the platform is thus readily solved.

Contrary to what occurs in the known device shown in FIG. 1, the axis about which torsion takes place is perpendicular to the sensitive axis Ox.

Figure 4:
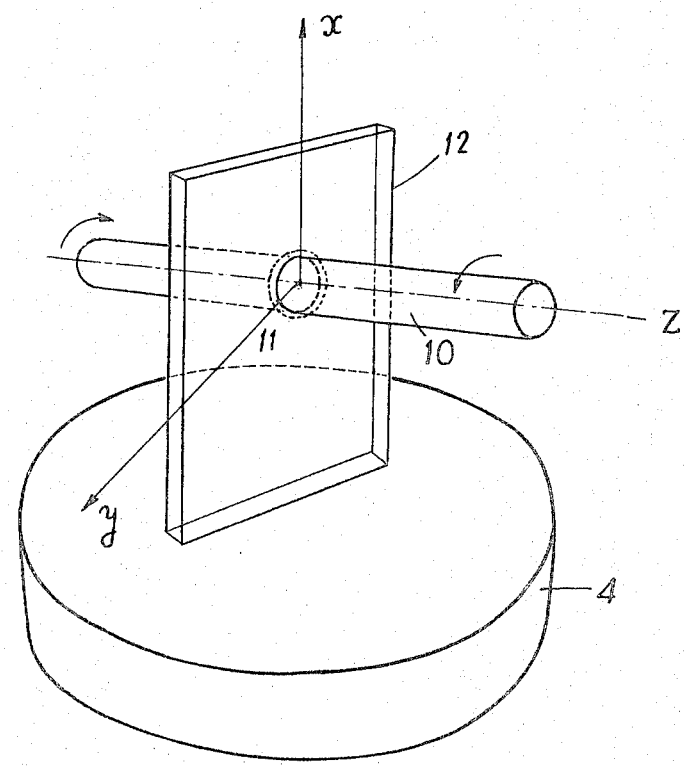
FIG. 4 shows a detail of FIG. 2.

FIG. 4 shows rod 10 clamped by means of a clamping ring 11 on support 12 rigidly connected to platform 4. From the direction of the arrows indicating the torsional vibrations, it can be seen that support 12 is in the nodal plane yOx of the torsional vibration. An important advantage which accrues from this is that the nodal line of the torsional movement is identical to the nodal line of the flexural movement.

In the case of the tuning fork of FIG. 1, the nodal line F of the bending passes through the bottom of prongs 3 and 2, while the nodal line of the torsion is the circle T.

Accordingly these two lines do not coincide. This is one of the causes of spurious vibration and prevents decoupling between the two movements.

Furthermore in FIG. 1 the connection between the platform and the vibrating unit, i.e. the tuning fork, is offset with respect to the fork, contrary to what takes place in the structure according to the present invention.

Also in the case of FIG. 1 axis Ox, about which the rotation, the angular velocity of which is to be measured, takes place and the output axis, coincide.

Accordingly, the coils which cause the prongs to vibrate and those used for measuring the torsional vibration have parallel axes. This drawback is avoided in the structure according to the invention, and coils 15 and 16 on the one side and coils 21 and 31 on the other side have their axes mutually perpendicular, thus avoiding any spurious circuits between the coils.

Of course the invention is not limited to the embodiment described and shown which was given solely by way of example.

What is claimed is:

1. An inertial tachometer for measuring the rotation of a platform about a predetermined axis comprising: a support solid with said platform and whose axis coincides with said axis; an elongated member rigidly and symmetrically supported by said support and extending normally to said axis; two prongs, having respective centers of symmetry, rigidly carried by said member at said centers and symmetrical with respect to said support; said prongs having two respective halves extending symmetrically with respect to the axis of said member; means for exciting in said prongs flexional vibrations parallel to said member and bending in opposite directions said opposite halves of said prongs; and means for measuring the torsional vibrations of said member.

2. An inertial tachometer for measuring the rotation of a platform about a predetermined axis comprising: a support solid with said platform and whose axis coincides with said axis; an elongated member rigidly and symmetrically supported by said support and extending normally to said axis; two prongs, having respective centers of symmetry, rigidly carried by said member at said center and symmetrical with respect to said support; said prongs having two respective halves extending symmetrically with respect to the axis of said member; coils carried by said support for exciting in said prongs flexional vibrations parallel to said member and bending in opposite directions said opposite halves of said prongs; and means for measuring the torsional vibrations of said member.

3. An inertial tachometer for measuring the rotation of a platform about a predetermined axis comprising: a support solid with said platform and whose axis coincides with said axis; an elongated member rigidly and symmetrically supported by said support and extending normally to said axis; two prongs, having respective centers of symmetry, rigidly carried by said member at said centers and symmetrical with respect to said support; said prongs having two respective halves extending symmetrically with respect to the axis of said member; means for exciting in said prongs flexional vibrations parallel to said member and bending in opposite directions said opposite halves of said prongs; and coils carried by said support and associated with said elongated member for measuring the torsional vibrations of said member upon rotation of said platform.

4. An inertial tachometer for measuring the rotation of a platform about a predetermined axis, comprising: a support solid with said platform and whose axis coincides with said axis; an elongated member rigidly and symmetrically supported by said support and extending normally to said axis; two prongs, having respective centers of symmetry, rigidly carried by said rod at said centers and symmetrical with respect to said support; said prongs having two respective halves extending symmetrically with respect to the axis of said member; means for exciting in said prongs flexional vibrations parallel to said member and bending in opposite directions said opposite halves of said prongs; and means for measuring the torsional vibrations of said rod.

5. An inertial tachometer for measuring the rotation of a platform about a predetermined axis comprising: an elongated member having an axis perpendicular to said axis and rigidly supported by said platform; two prongs rigidly carried by said member; said prongs having two respective halves extending symmetrically with respect to the axis of said member; means for exciting in said prongs flexional vibrations parallel to said member and bending in opposite directions said opposite halves of said prongs, and means for measuring the torsional vibrations of said member.

6. An inertial tachometer for measuring the rotation of a platform comprising about a predetermined axis: a first member carried by said platform normally to said axis; two prongs carried by said member; said prongs having two respective halves extending symmetrically with respect to the axis of said member; means for exciting in said prongs flexural vibrations parallel to said member and bending in opposite directions said opposite halves of said prongs; the nodal line of said flexural vibrations coinciding with the nodal line of the torsional vibrations appearing in said member upon rotation of said platform.

References Cited by the Examiner

UNITED STATES PATENTS 3,206,986  9/1965  Christensen _____ 73—505

FOREIGN PATENTS 611,011  10/1948  Great Britain.

RICHARD C. QUEISSER, *Primary Examiner.*

JAMES J. GILL, *Examiner.*